US009654306B1

(12) United States Patent
Molev Shteiman et al.

(10) Patent No.: US 9,654,306 B1
(45) Date of Patent: May 16, 2017

(54) SYSTEM AND METHOD FOR MULTI-SOURCE CHANNEL ESTIMATION

(71) Applicant: Futurewei Technologies, Inc., Plano, TX (US)

(72) Inventors: Arkady Molev Shteiman, Bridgewater, NJ (US); Xiao Feng Qi, Westfield, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/943,946

(22) Filed: Nov. 17, 2015

(51) Int. Cl.
*H04L 25/02* (2006.01)
*H04B 7/0413* (2017.01)

(52) U.S. Cl.
CPC ....... *H04L 25/0202* (2013.01); *H04B 7/0413* (2013.01)

(58) Field of Classification Search
USPC .......................................................... 375/267
See application file for complete search history.

(56) References Cited

U.S. PATENT DOCUMENTS

| 5,852,630 | A | * | 12/1998 | Langberg | ............ | H04L 27/2647 |
| | | | | | | 375/219 |
| 6,349,119 | B1 | | 2/2002 | Sogebe et al. | | |
| 8,718,674 | B2 | | 5/2014 | Germond et al. | | |
| 2005/0136943 | A1 | | 6/2005 | Banerjee et al. | | |
| 2006/0072651 | A1 | | 4/2006 | Kent et al. | | |
| 2009/0029658 | A1 | * | 1/2009 | Kwak | ................. | G01S 13/0209 |
| | | | | | | 455/114.3 |
| 2012/0219093 | A1 | * | 8/2012 | Jia | ........................ | H04L 1/0003 |
| | | | | | | 375/308 |
| 2013/0301563 | A1 | | 11/2013 | Gupta et al. | | |
| 2015/0355320 | A1 | * | 12/2015 | Kim | .................... | G01S 13/0209 |
| | | | | | | 342/21 |

FOREIGN PATENT DOCUMENTS

| CN | 101795246 A | 8/2010 |
| CN | 102143101 A | 8/2011 |
| CN | 102308228 A | 5/2014 |

OTHER PUBLICATIONS

Dammann A., et al., "WHERE2 Location Aided Communications," European Wireless, Guildford, UK, Apr. 16-18, 2013, pp. 1-8.

(Continued)

*Primary Examiner* — Eva Puente
(74) *Attorney, Agent, or Firm* — Futurewei Technologies, Inc.

(57) ABSTRACT

A method for associating signal sources and paths includes determining secondary paths of a signal received at a reception point, wherein the signal reflects off one or more reflective surfaces before being received at the reception point, determining mirror sources of the secondary paths in accordance with locations of the one or more reflective surfaces and a main source of the signal, determining associations between the secondary paths and the mirror sources based on cross points at which the signal reflected off the one or more reflective surfaces, thereby obtaining path-source associations, and instructing use of the path-source associations in multi-source channel estimation.

22 Claims, 17 Drawing Sheets

(56) References Cited

OTHER PUBLICATIONS

Di Taranto, R., et al., "Location-Aware Communications for 5G Networks," IEEE Signal Processing Magazine, Nov. 2014, pp. 102-112.
Guibene, W., et al., "Degrees of Freedom of Downlink Single- and Multi-Cell Multi-User MIMO Systems with Location Based CSIT," Vehicular Technology Conference, Jun. 5, 2013, pp. 1-5.
Larsson, E. G., et al., "Massive MIMO for Next Generation Wireless Systems," IEEE Communications Magazine, Feb. 2014, pp. 186-195.
Li, J., "Joint Estimation of Channel Parameters for MIMO Communication Systems," Wireless Communications Systems, Sep. 7, 2005, pp. 22-26.
Li, J., "Position Location of Mobile Terminal in Wirless MIMO Communications Systems," Journal of Communications and Networks, vol. 9, No. 3, Sep. 2007, pp. 254-264.
Rusek, F., et al., "Scaling Up MIMO," IEEE Signal Processing Magazine, Jan. 2013, pp. 40-60.
Slock, D., "MIMO Broadcast and Interference Channels with Location based Partial CSIT," European Wireless 2013, Apr. 16-18, 2013, Guildford, UK, pp. 1-6.
Slock, D., "Location Aided Wireless Communications," Proceedings of the 5th International Symposium on Communications, Control and Signal Processing, ISCCSP 2012, Italy, Rome, May 2-4, 2012, 6 pages.
Fumio Ikegami, Fellow, IEEE, Tsutomu Takeuchi, Member, IEEE and Susuma Yoshida, Member, IEEE: "Theoretical prediction of mean field strength for urban mobile radio", IEEE, dated Aug. 6, 2002, p. 299-302, total 4 pages.

\* cited by examiner

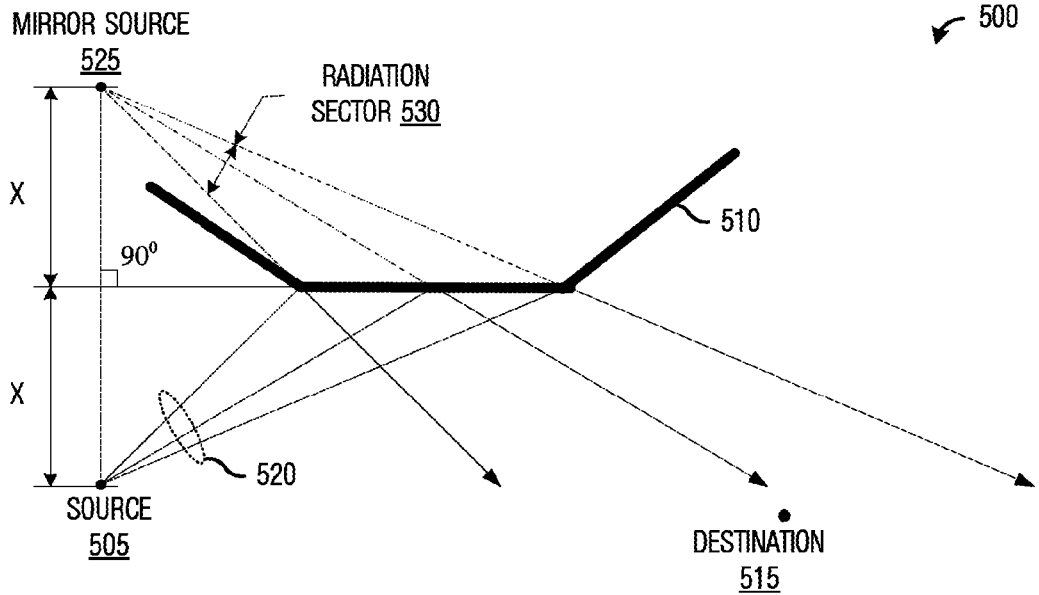
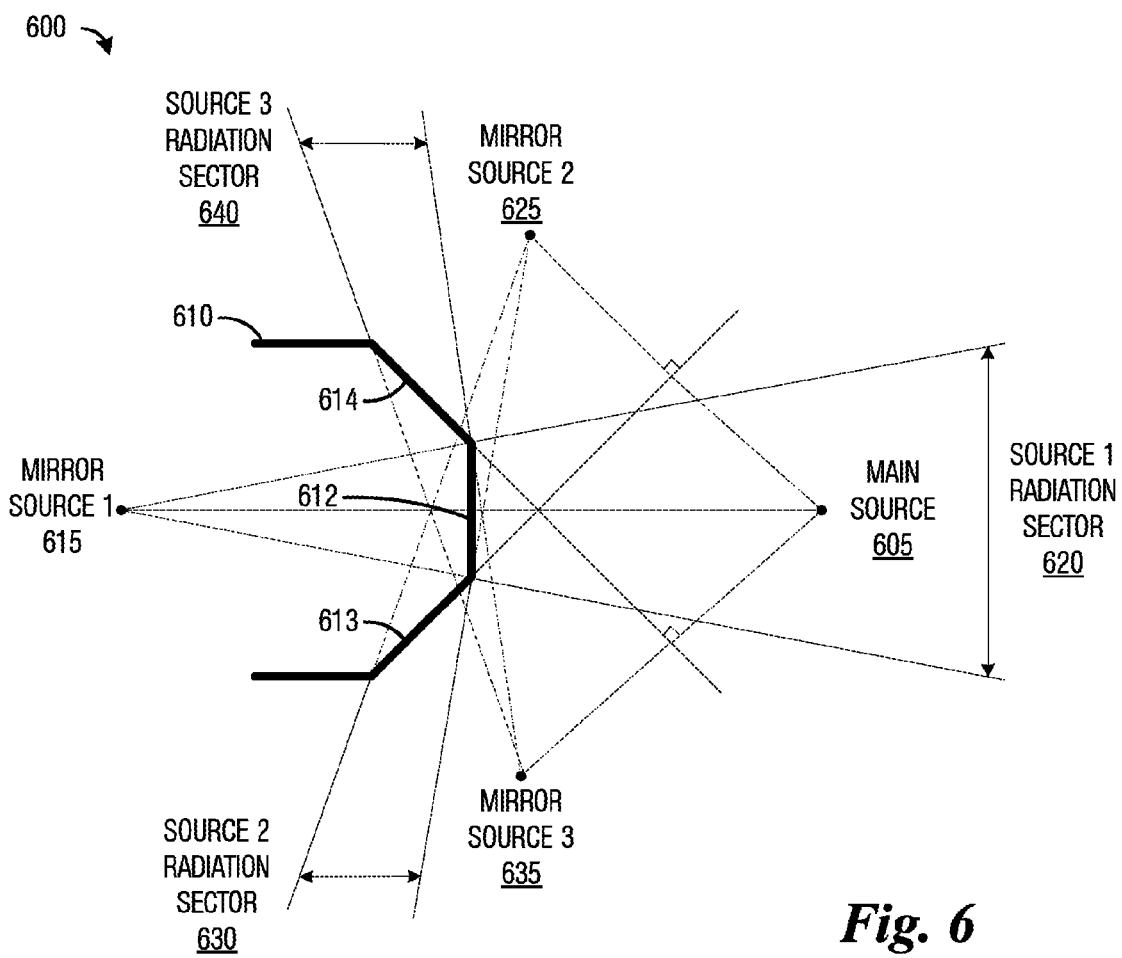

US 9,654,306 B1

SYSTEM AND METHOD FOR MULTI-SOURCE CHANNEL ESTIMATION

TECHNICAL FIELD

The present disclosure relates generally to digital communications, and more particularly to a system and method for multi-source channel estimation.

BACKGROUND

In general, multiple input multiple output (MIMO) increases the capacity of a radio link through the use of multiple transmit antennas and multiple receive antennas. MIMO exploits multipath propagation to increase the capacity of the radio link. MIMO has proven to be effective at increasing the capacity of the radio link and has been accepted into a variety of technical standards, including WiFi or Wireless LAN: IEEE 802.11n, and IEEE 802.11ac; Evolved High-Speed Packet Access (HSPA+); Worldwide Interoperability for Microwave Access (WiMAX); and Third Generation Partnership Project (3GPP) Long Term Evolution (LTE) Advanced.

Increasing the number of transmit antennas and receive antennas from a relatively small number (on the order of 10 or fewer) to a significantly larger number (on the order of 100, 1000, 10000, or more) can lead to even greater increases in the capacity of the radio link. Such MIMO communications systems are referred to as large-scale MIMO communications systems.

Channel estimation is a complex and time intensive operation. Under the multi-path model, channel estimation is performed for every multi-path at each antenna and involves individually receiving reference signals transmitted over each multi-path. Therefore, at a MIMO communications device, such as a large scale MIMO communications device, the number of channel estimations can be very large. For example, in a 10000 antenna MIMO communications device with 3 multi-paths, there will be 30000 channel estimations even for a user terminal equipped with a single antenna.

SUMMARY OF THE DISCLOSURE

Example embodiments provide a system and method for multi-source channel estimation.

In accordance with an example embodiment, a method for associating signal sources and paths is provided. The method includes determining secondary paths of a signal received at a reception point, wherein the signal reflects off one or more reflective surfaces before being received at the reception point, determining mirror sources of the secondary paths in accordance with locations of the one or more reflective surfaces and a main source of the signal, determining associations between the secondary paths and the mirror sources based on cross points at which the signal reflected off the one or more reflective surfaces, thereby obtaining path-source associations, and instructing use of the path-source associations in multi-source channel estimation.

In accordance with another example embodiment, a device adapted to associate signal sources and paths is provided. The device includes a processor, and a computer readable storage medium storing programming for execution by the processor. The programming including instructions configuring the device to determine secondary paths of a signal received at a reception point, wherein the signal reflects off one or more reflective surfaces before being received at the reception point, to determine mirror sources of the secondary paths in accordance with locations of the one or more reflective surfaces and a main source of the signal, to determine associations between the secondary paths and the mirror sources based on cross points at which the signal reflected off the one or more reflective surfaces, thereby obtaining path-source associations, and to instruct use of the path-source associations in multi-source channel estimation.

In accordance with another example embodiment, a multiple input multiple output (MIMO) communications system is provided. The MIMO communications system includes a main transmission point, a MIMO communications device, and an associating device. The MIMO communications device includes an antenna array comprising a plurality of antenna units, and a first processor. The associating device includes a second processor, and a computer readable storage medium storing programming for execution by the second processor. The programming including instructions configuring the associating device to determine secondary paths of a signal received at a reception point, wherein the signal reflects off one or more reflective surfaces before being received at the reception point, determine mirror sources of the secondary paths in accordance with locations of the one or more reflective surfaces and a main source of the signal, determine associations between the secondary paths and the mirror sources based on cross points at which the signal reflected off the one or more reflective surfaces, thereby obtaining path-source associations, and instruct use of the path-source associations in multi-source channel estimation.

Practice of the foregoing embodiments enables low complexity channel estimation in a large scale MIMO communications device by using associations between signal paths and signal sources.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 5 illustrates an example communications system highlighting the modeling of a transmission following a secondary path and reflecting off a flat surface according to example embodiments described herein;

FIG. 6 illustrates an example communications system highlighting the modeling of a transmission following a secondary path and reflecting off a broken surface according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to multi-source channel estimation. For example, a device determines secondary paths of a signal received at a reception point, wherein the signal reflects off one or more reflective surfaces before being received at the reception point, determining mirror sources of the secondary paths in accordance with locations of the one or more reflective surfaces and a main source of the signal, determines associations between the secondary paths and the mirror sources based on cross points at which the signal reflected off the one or more reflective surfaces, thereby obtaining path-source associations, and instructs use of the path-source associations in multi-source channel estimation.

The embodiments will be described with respect to example embodiments in a specific context, namely MIMO communications systems that support beamforming with antenna arrays having a plurality of transmit antennas and receive antennas. The embodiments may be applied to standards compliant communications systems, such as those that are compliant with Third Generation Partnership Project (3GPP), IEEE 802.11, WiMAX, HSPA, and the like, technical standards, and non-standards compliant MIMO communications systems, that support beamforming with antenna arrays having a plurality of transmit antennas and receive antennas.

Figure 1:
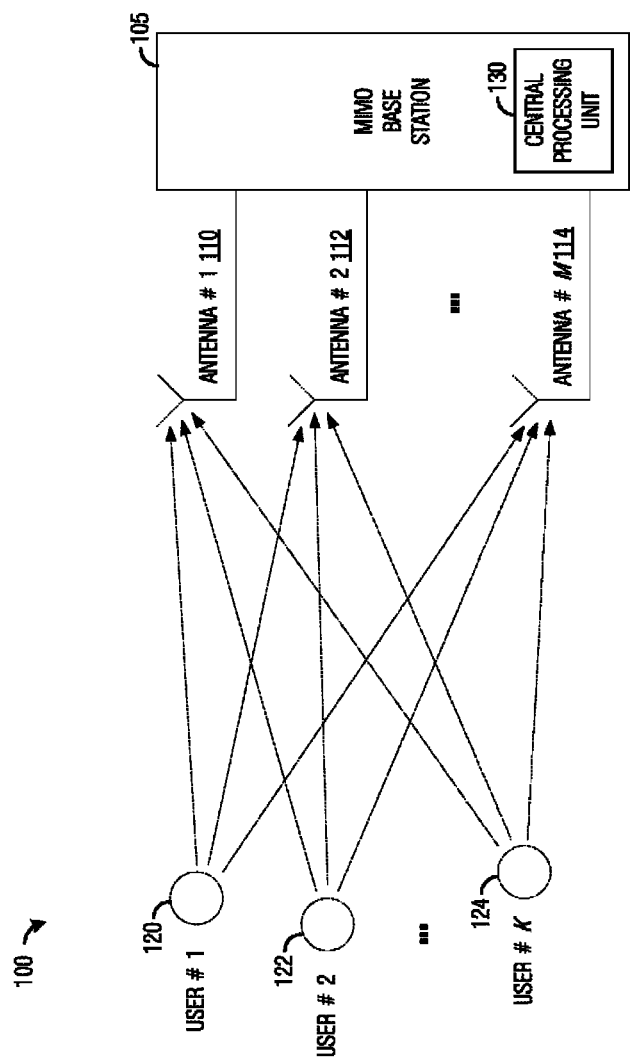
FIG. 1 illustrates an example communications system highlighting MIMO reception according to example embodiments described herein.

FIG. 1 illustrates an example communications system 100 highlighting MIMO reception. Communications system 100 includes a MIMO base station 105 serving K users, such as user #1 120, user #2 122, and user #K 124, where K is an integer number greater than or equal to 1. MIMO base station 105 includes M receive antennas, such as antenna #1 110, antenna #2 112, and antenna #M 114, where M is an integer number greater than or equal to 1. In a large scale MIMO implementation, M may be on the order of 100s, 1000s, 10000s, or even greater. A special case of large scale MIMO is referred to as massive MIMO. Massive MIMO may involve an extremely large number of antennas, 100000 or more. A base station may also be referred to as an access point, a NodeB, an evolved NodeB (eNB), a communications controller, and so on, while a user may also be referred to as a mobile station, a mobile, a terminal, a subscriber, a user equipment (UE), and so forth. MIMO base station 105 also includes a central processing unit 130 configured to estimate signals transmitted by the users and received by MIMO base station 105.

While it is understood that communications systems may employ multiple base stations capable of communicating with a number of users, only one base station, and a number of users are illustrated for simplicity.

In communications system 100, the K users share the same communications system resources (such as time-frequency resources). To simplify discussion, each user is equipped with only one antenna. However, the example embodiments presented herein are operable with users with any number of antennas. Each of the M receive antennas at MIMO base station 105 are equipped with its own radio frequency (RF) hardware (such as filters, amplifiers, mixers, modulators, demodulators, constellation mappers, constellation demappers, and the like), analog to digital (A/D) converters, digital to analog (D/A) converters, as well as a local processing unit that is capable of performing a limited amount of processing. The local processing unit, the antenna and the associated hardware may be referred to as an antenna unit (AU). The local processing unit is referred to herein as an AU processing unit.

Communications system 100 may be represented as a mathematical model expressible as:

$$\begin{bmatrix} y_1 \\ y_2 \\ \vdots \\ y_M \end{bmatrix} = \begin{bmatrix} a_{1,1} & a_{1,2} & \cdots & a_{1,K} \\ a_{2,1} & a_{2,2} & \cdots & a_{2,K} \\ \vdots & \vdots & & \vdots \\ a_{M,1} & a_{M,2} & \cdots & a_{M,K} \end{bmatrix} \cdot \begin{bmatrix} x_1 \\ x_2 \\ \vdots \\ x_K \end{bmatrix} + \begin{bmatrix} n_1 \\ n_2 \\ \vdots \\ n_M \end{bmatrix}$$

or $$Y = A \cdot X + N,$$

where X is a transmitted symbol vector of length K in which each element $x_k$ represents a data symbol associated with user k; Y is a received sample vector of length M in which each element $y_m$, represents a sample of receive antenna m; N is a receiver noise sample vector of length M in which each element $n_m$ represents the noise receive on receive antenna m, it is assumed that N is additive white Gaussian noise (AWGN); A is a channel matrix of size M by K in which each element $a_{m,k}$ represents a channel transfer function between user k and receive antenna m; K is the number of users served by MIMO base station 105; and M is the number of receive antennas of MIMO base station 105. In general, a MIMO receiver has to resolve the above expression and given the received sample vector Y, find an estimate of the transmitted symbol vector X (denoted $\hat{X}$) that is as close as possible to the transmitted symbol vector X.

Figure 2:
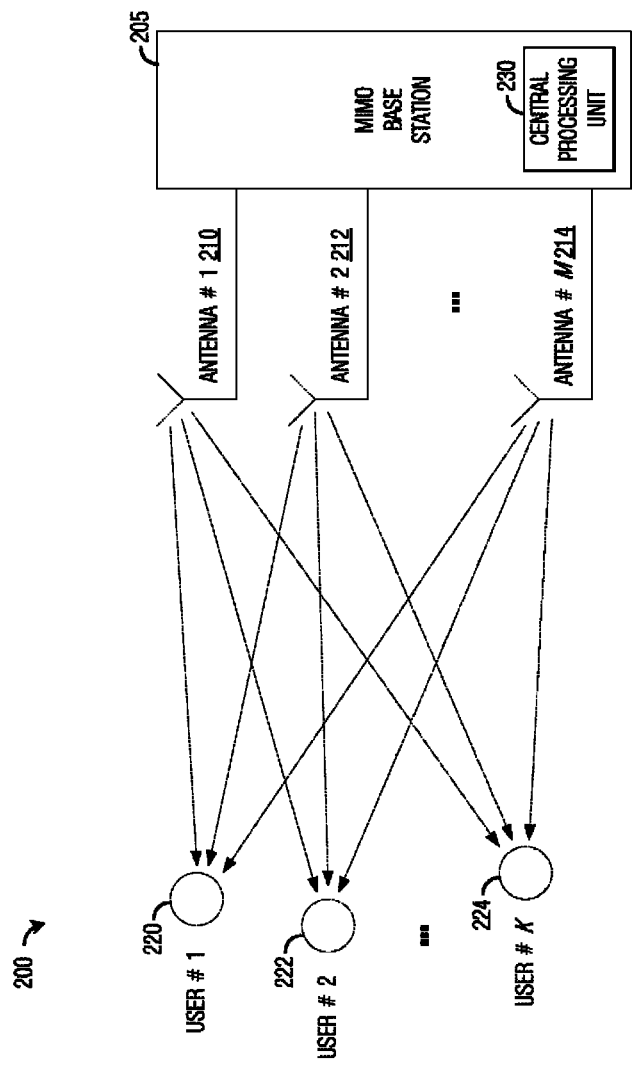
FIG. 2 illustrates an example communications system highlighting MIMO transmission according to example embodiments described herein.

FIG. 2 illustrates an example communications system 200 highlighting MIMO transmission. Communications system 200 includes a MIMO base station 205 serving K users, such as user #1 220, user #2 222, and user #K 224, where K is an integer number greater than or equal to 1. MIMO base station 205 includes M transmit antennas, such as antenna #1 210, antenna #2 212, and antenna #M 214, where M is an integer number greater than or equal to 2. In a large scale MIMO implementation, M may be on the order of 100s, 1000s, 10000s, or even greater. MIMO base station 205 also includes a central processing unit 230 configured to assist in precoding transmissions to the K users. Central processing unit 230 is also configured to assist in channel estimation.

Communications system 200 may be represented as a mathematical model expressible as:

$$\begin{bmatrix} r_1 \\ r_2 \\ \vdots \\ r_K \end{bmatrix} = \begin{bmatrix} a_{1,1} & a_{1,2} & \cdots & a_{1,K} \\ a_{2,1} & a_{2,2} & \cdots & a_{2,K} \\ \vdots & \vdots & & \vdots \\ a_{K,1} & a_{K,2} & \cdots & a_{K,M} \end{bmatrix} \cdot \begin{bmatrix} w_{1,1} & w_{1,2} & \cdots & w_{1,K} \\ w_{2,1} & w_{2,2} & \cdots & w_{2,K} \\ \vdots & \vdots & & \vdots \\ w_{M,1} & w_{M,2} & \cdots & w_{M,K} \end{bmatrix} \cdot \begin{bmatrix} x_1 \\ x_2 \\ \vdots \\ x_K \end{bmatrix}$$

or $$R = A \cdot W \cdot X + N,$$

where X is a transmitted symbol vector of length K in which each element $x_k$ represents a symbol of user k; R is a received sampled vector of length K in which each element $r_k$ represents a sample received by user k; N is a received noise vector of length K in which each element $n_k$ represents noise received by user k (it is assumed that N is AWGN); A is a channel matrix of size M by K in which each element $a_{m,k}$ represents the channel transfer function between user k and transmit antenna m; and W is a precoding matrix of size K by M.

As discussed previously, beamforming is a signal processing technique used for directional communications (signal transmission and/or reception). Beamforming involves combining antenna elements in such a way that some directions experience constructive interference while other directions experience destructive interference, therefore generating a communications beam in an intended direction. Therefore, in order to utilize beamforming, a communications device needs to obtain directional information regarding other communications devices with which it is communicating. From the directional information, the communications device may be able to generate antenna coefficients to generate communications beams directed towards the other communications devices.

In the far field, the distance between an antenna array of a large scale MIMO communications device and a UE are sufficiently large (generally, the distance between the large scale MIMO communications device and the UE is more than an order of magnitude greater than the dimensions of the antenna array) so that communications beams arriving at the antenna array from the UE are considered to be parallel. However, in the near field, the assumption of the parallel communications beams does not hold up since the distance between the large scale MIMO communications device and the UE is not so great.

Figure 3:
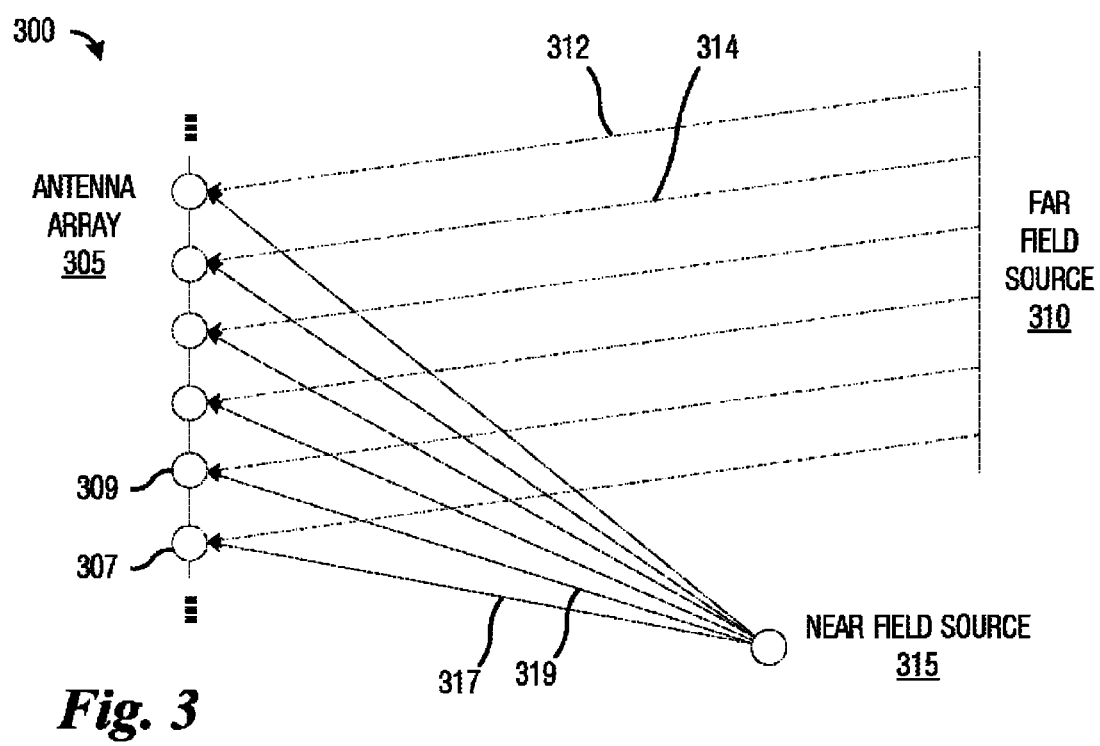
FIG. 3 illustrates an example communications system highlighting far field sources and near field sources according to example embodiments described herein.

FIG. 3 illustrates an example communications system 300 highlighting far field sources and near field sources. Communications system 300 includes an antenna array 305 that includes a plurality of antennas, such as antenna 307 and antenna 309. Communications system 300 also includes a far field source 310 and a near field source 315. Far field source 310 is located at least an order of magnitude further away from antenna array 305 than the dimensions of antenna array 305, while near field source 315 is located less than an order of magnitude of the dimensions of antenna array 305 away from antenna array 305.

Communications beams from far field source 310, such as communications beams 312 and 314, are parallel (or substantially parallel) as they arrive at antenna array 305. Since the communications beams are parallel, they have the same direction of arrival. On the other hand, communications beams from near field source 315, such as communications beams 317 and 319, are not parallel as they arrive at antenna array 305. Hence the directions of arrival of the communications beams from near field source 315 are different.

When a transmission is made from a transmission point (e.g., an AP in a downlink transmission or a UE in an uplink transmission) to a reception point (e.g., the UE in the downlink transmission or the AP in the uplink transmission), the transmission may take a primary path from the transmission point to the reception point. However, if there are objects in the vicinity of the transmission point and the reception point, the transmission may reflect off these objects and take secondary paths from the transmission point to the reception point. In general, a primary path is a direct path between a transmission point and a reception point. There are also secondary paths that involve the transmission reflecting off one or more surfaces after leaving the transmission point before arriving at the reception point. The transmissions taking the primary and secondary paths to the reception point may be referred to as multipath. The transmissions taking the secondary paths have greater delay than the transmissions taking the primary path due to the longer path. The transmissions on the secondary paths may be exploited to improve communications performance or they may be interference and degrade performance. Each of the paths (primary and secondary) may be modeled by using channel estimation techniques. However, when the reception point has a large scale MIMO antenna array, channel estimation may be computationally intensive since channel estimation is performed at each antenna for each path (primary and secondary).

Figure 4:
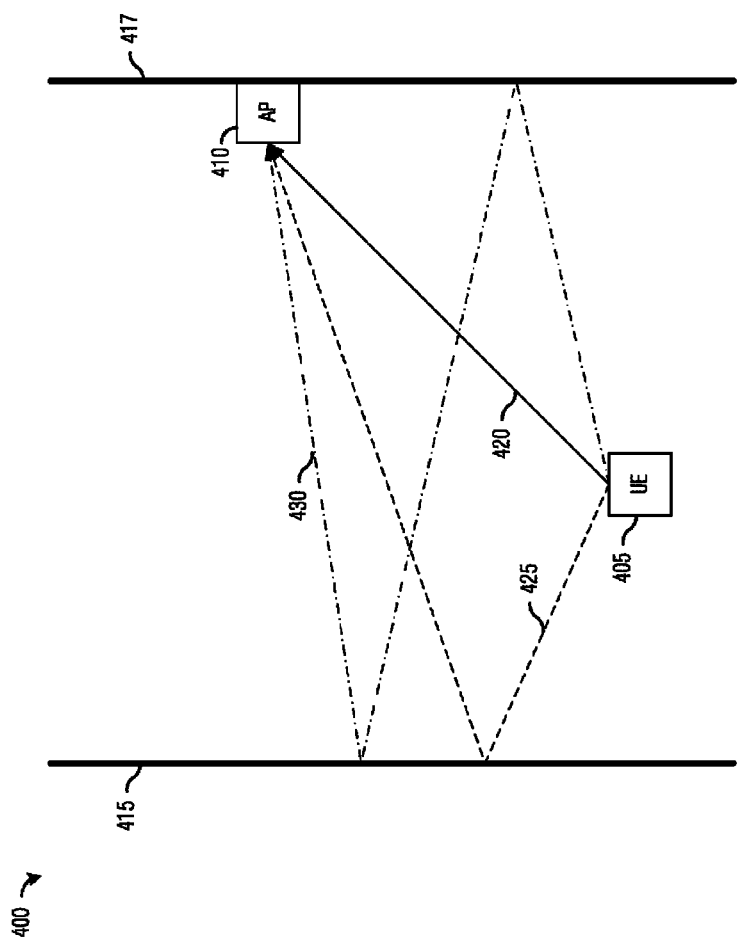
FIG. 4 illustrates an example communications system, highlighting primary and secondary paths according to example embodiments described herein.

FIG. 4 illustrates an example communications system 400, highlighting primary and secondary paths. Communications system 400 includes communicating devices, UE 405 and AP 410. As shown in FIG. 4, UE 405 is making an uplink transmission to AP 410. In other words, UE 405 is the transmission point and AP 410 is the reception point. Communications system 400 is deployed in between a first wall 415 and a second wall 417. As an example, communications system 400 is deployed indoors.

When UE 405 sends a transmission to AP 410, the transmission may follow a primary path 420. The transmission may also follow several secondary paths, such as first secondary path 425 where the transmission reflects off first wall 415 before arriving at AP 410, or a second secondary path 430 where the transmission reflects off second wall 417 and first wall 415 before arriving at AP 410. In general, when there are more objects in the vicinity of the communicating devices, the more paths there are between the communicating devices. However, depending on the type of objects involved, significant power is lost at each reflection. Therefore transmissions over paths comprising more than three or four reflections may be so low in power that they may not be significant and it is possible to ignore them.

According to an example embodiment, transmissions taking secondary paths are modeled as originating at mirror sources instead of originating at their main source and reflecting off intermediary objects. A transmission following a secondary path that includes one or more reflections may be modeled as originating at a mirror source and following a primary path rather than originating at the main source and following the secondary path.

FIG. 5 illustrates an example communications system 500 highlighting the modeling of a transmission following a secondary path and reflecting off a flat surface. In communications system 500, a transmission originates at main source 505 and reflects off reflective surface 510 towards a destination 515. A range of transmissions 520 reflects off reflective surface 510 while maintaining an orientation towards destination 515. It is possible to model the transmissions reflecting off reflective surface 510 as originating at a mirror source 525. Transmissions from mirror source 525 pass through reflective surface 510 on towards destination 515. A radiation sector 530 corresponds to a range of transmission angles that correspond to range of transmissions 520. As shown in FIG. 5, secondary paths due to reflective surface 510 may be modeled as mirror source 525 that is symmetrical to main source 505 with respect to reflective surface 510. As the size of reflective surface 515 increases, the likelihood that multiple destinations will receive transmissions from mirror source 525 also increases.

FIG. 6 illustrates an example communications system 600 highlighting the modeling of a transmission following a secondary path and reflecting off a broken surface. In communications system 600, a transmission originates at main source 605 and reflects off reflective surface 610. It is possible to model the transmissions reflecting off reflective surface 610 as originating at one of a plurality of mirror sources depending upon where on reflective surface 610 the transmission reflects. As an illustrative example, a transmission reflecting off a first sub-surface 612 may be modeled as originating at mirror source1 615 with a corresponding source1 radiation sector 620. Similarly, a transmission reflecting off a second sub-surface 613 may be modeled as originating at mirror source2 625 with a corresponding source2 radiation sector 630 and a transmission reflecting off a third sub-surface 614 may be modeled as originating at mirror source3 635 with a corresponding source3 radiation sector 640. Since the radiation sectors of mirror sources arising from the broken surface tends to be small, the likelihood that multiple destinations will receive transmissions reflecting off from the broken surface is small.

Figure 7:
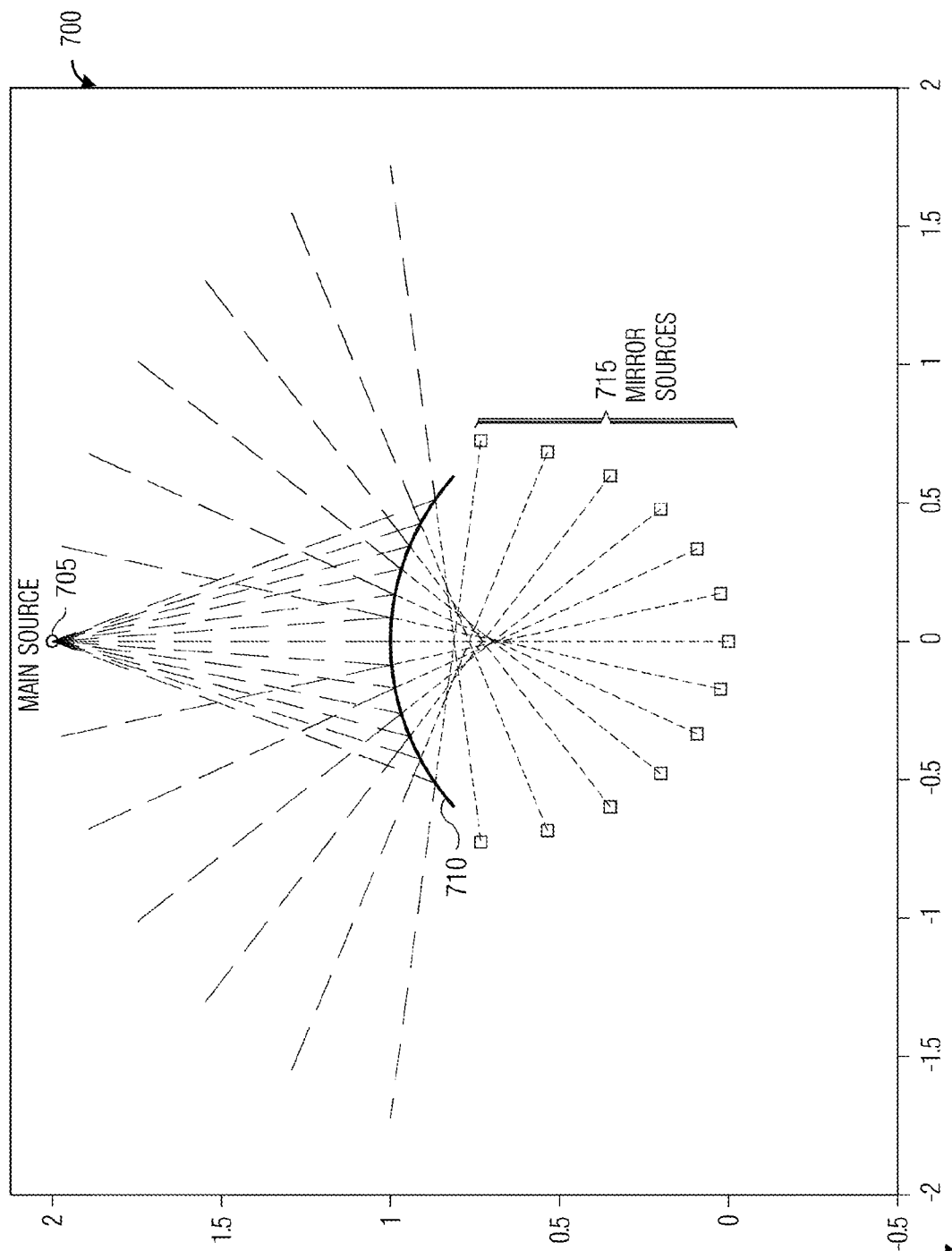
FIG. 7 illustrates an example communications system highlighting the modeling of a transmission following a secondary path and reflecting off a curved surface according to example embodiments described herein.

FIG. 7 illustrates an example communications system 700 highlighting the modeling of a transmission following a secondary path and reflecting off a curved surface. The curved surface may be modeled as an infinite number of small flat surfaces. In communications system 700, a transmission originates at main source 705 and reflects off reflective surface 710. It is possible to model the transmissions reflecting off reflective surface 710 as originating at one of a plurality of mirror sources (mirror sources 715) depending upon where on reflective surface 710 the transmission reflects. Since reflective surface 710 is modeled as an infinite number of small flat surfaces, the likelihood that multiple destinations will receive transmissions reflecting off the curved surface tends towards 0.

In general, the more flat surfaces with large surface area are present in a deployment of a communications system, the more mirror sources with wide radiation sectors are present, thereby leading to high likelihood that many destinations will receive transmissions reflecting off the flat surfaces. In a typical indoor deployment, there are large numbers of such surfaces, including walls, ceilings, roofs, doors, windows, screens, desks, pictures, appliances, furniture, and so on. These surfaces may provide multiple mirror sources that will be receivable by more destinations. Small objects, such as pictures, mirrors, and so forth, may add additional mirror sources while not be significantly large to split a main source with a large radiation sector into smaller radiation sectors.

Figure 8A:
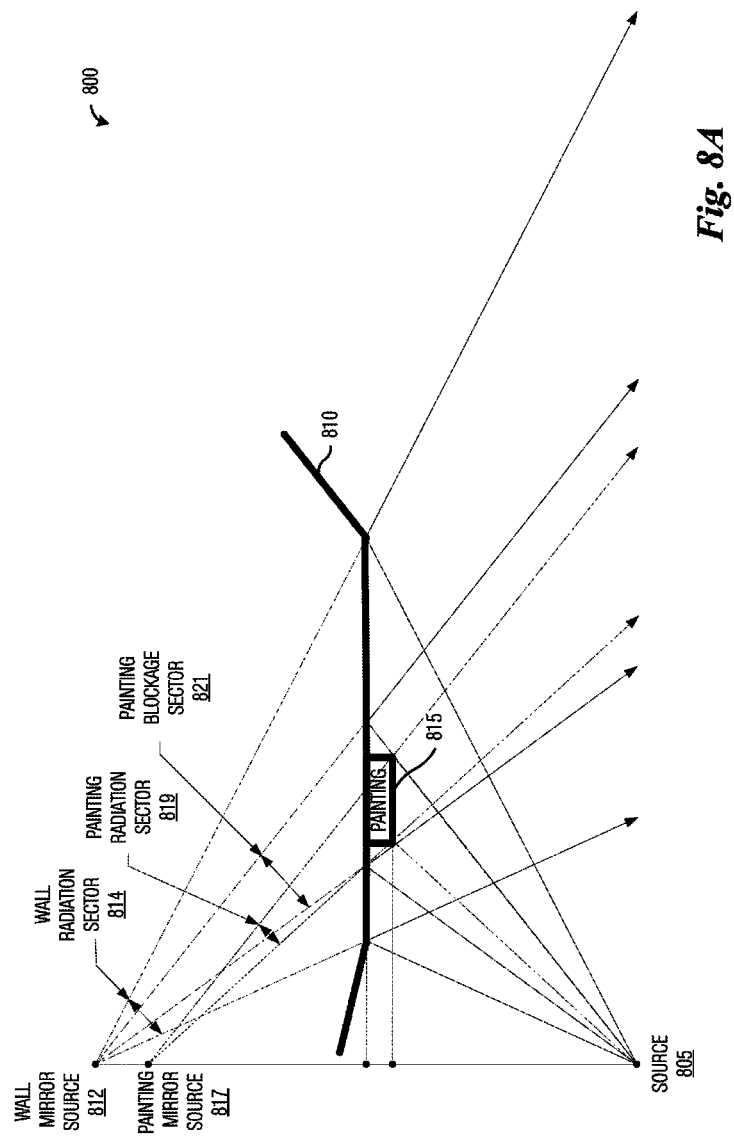
FIG. 8A illustrates an example communications system highlighting the modeling of a transmission following a secondary path with a blockage according to example embodiments described herein.

FIG. 8A illustrates an example communications system 800 highlighting the modeling of a transmission following a secondary path with a blockage. In communications system 800, a transmission originates at main source 805 and reflects off reflective surface 810. On reflective surface 810 is a painting 815. Painting 815 may not be as reflective as reflective surface 810 and may be viewed as a blockage. It is possible to model the transmissions reflecting off reflective surface 810 as originating at a wall mirror source 812 and transmissions reflecting off painting 815 as originating at painting mirror source 817. Wall mirror source 812 has a radiation sector 814 and painting mirror source 817 has radiation sector 819 and a blockage sector 821.

Figure 8B:
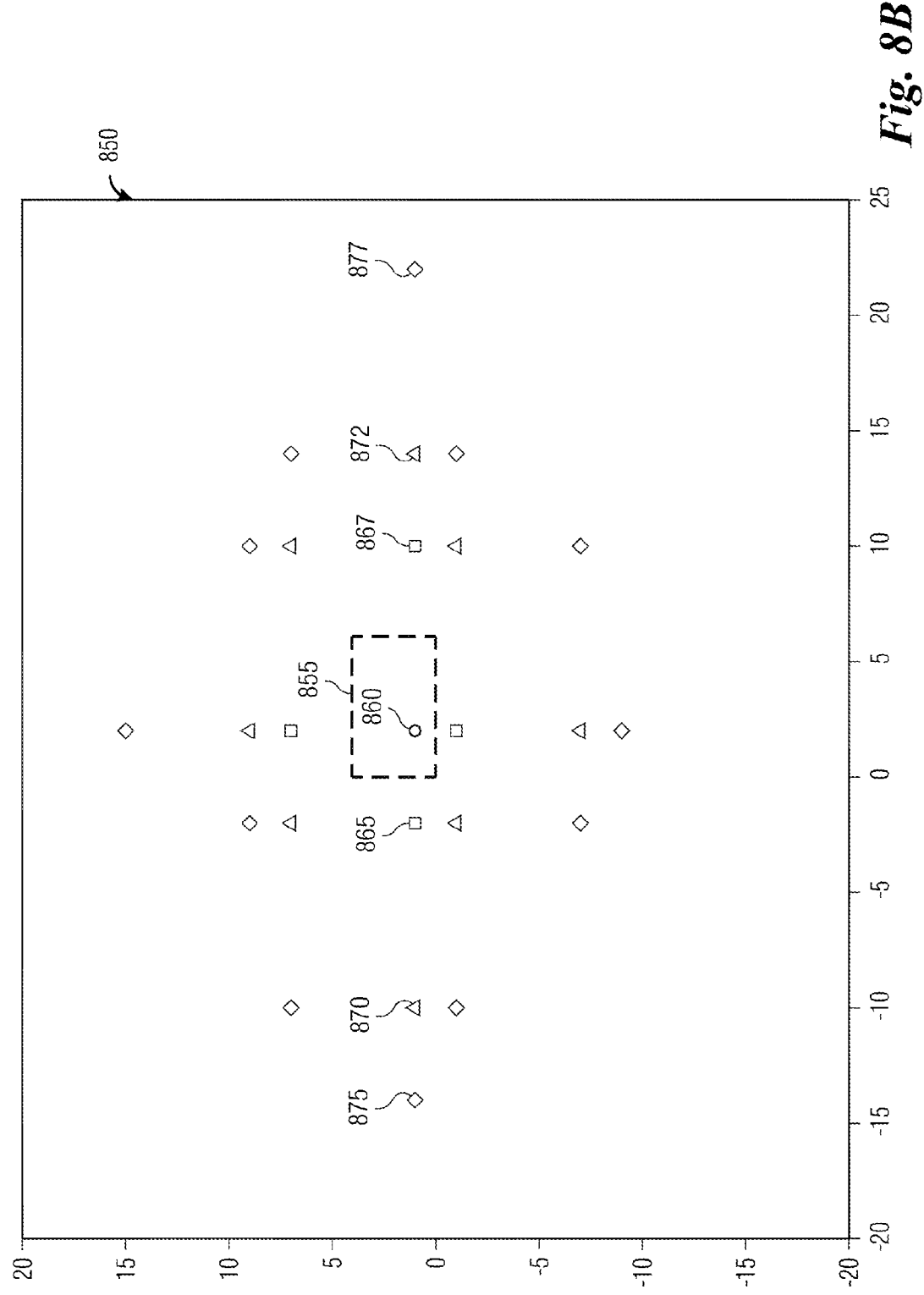
FIG. 8B illustrates a two-dimensional view of a rectangular room, highlighting the positions of main sources and mirror sources according to example embodiments described herein.

FIG. 8B illustrates a two-dimensional view 850 of a rectangular room 855, highlighting the positions of main sources and mirror sources. The two-dimensional view of rectangular room 855 may be a top-down or bottom-up view. Alternatively, if rectangular room 855 had a ceiling and a floor formed from radiation absorbing material, the rectangular room 855 may be viewed as a two-dimensional room.

As shown in FIG. 8B, a main source 860 is positioned inside rectangular room 855. Main source 855 has 4 first reflection mirror sources, such as first reflection mirror sources 865 and 867, and 8 second reflection mirror sources, such as second reflection mirror sources 870 and 877, and 12 third reflection mirror sources, such as third reflection mirror sources 875 and 877.

A portion of the energy present in the electromagnetic beam is absorbed by the reflection surface. Furthermore, there are also propagation losses. Therefore, the energy of the mirror sources decrease as the number of reflections increase. Eventually, the energy of the higher order mirror sources approach zero. Hence, the number of significant mirror sources is finite. As an illustrative example, a number of significant mirror sources is equal the number of mirror sources wherein an accumulation of the energy levels of the mirror sources meets a threshold (e.g., 90%) of the total signal energy.

According to an example embodiment, channel estimation at a reception point is performed based on positions of main sources and mirror sources of transmissions received by the reception point, as well as associations between the main and/or mirror sources and paths (primary and/or secondary paths). Channel estimation based on the positions of main sources and mirror sources of transmissions received by the reception point, as well as associations between the main and/or mirror sources and paths, simplifies the channel estimation process by eliminating a need for the reception point to receive and process reference signals transmitted over the primary and secondary paths of the multipath between the main source of the transmission and each of the antennas in the antenna array of the reception point. Therefore, the channel estimation complexity is reduced. Additionally, the amount of information stored regarding the estimated channels based on the positions of the main sources and mirror sources of the transmissions is less than the amount of information stored when channel estimation is derived from the processing of received reference signals. Hence, the channel estimates storage and/or communications overhead (such as when the channel estimates are communicated) is reduced.

According to an example embodiment, the associations between the main and/or mirror sources and paths are stored as generated in a database that allows for subsequent retrieval so that overhead involved in determining the associations are generally incurred only once. As an illustrative example, a reception point determines the locations of main and/or mirror sources and searches the database using the locations. The reception point may be able to retrieve associations between the main and/or mirror sources and paths, as well as locations of reflective surfaces, absorptive surfaces, and so on. Accessing the information stored in the database may save the reception point significant overhead. The database may be local or remote. The database may be accessible wirelessly or using a wireline connection. The database may be implemented in a standalone entity or it may be co-located with another entity.

According to an example embodiment, the information stored in the database is refined over time. As an illustrative example, a reception point is located at a position that already has information associated with it stored in the database but at a different time and/or day or date; the reception point is still able to make use of the information stored in the database to simplify its computations. The reception point may also be able to refine or enhance the quality of the information stored at the database by supplementing the information stored at the database by providing its own information. The multiple independently derived versions of the information (collected and derived at different times, days, or dates) may be combined to improve the quality of the information stored at the database. As an illustrative example, the multiple independently derived versions of the information may be combined (e.g., averaged, weighted and then averaged, and so forth). As another illustrative example, the multiple independently derived versions of the information may be stored with different time stamps, allowing future users to retrieve a version of the information that most closely matches their situation (e.g., time of day, day of week, day of month, and so on).

According to an example embodiment, the associations between the main and/or mirror sources and paths stored in a database are used to determine the locations of main and/or mirror sources that are blocked. As an illustrative example, the coordinates of reflective surfaces are retrieved from the database based on coordinates of the main and/or mirror sources. As an illustrative example, the location of a main source is retrieved from the database based on known coordinates of mirror sources and reflective surfaces.

Figure 9:
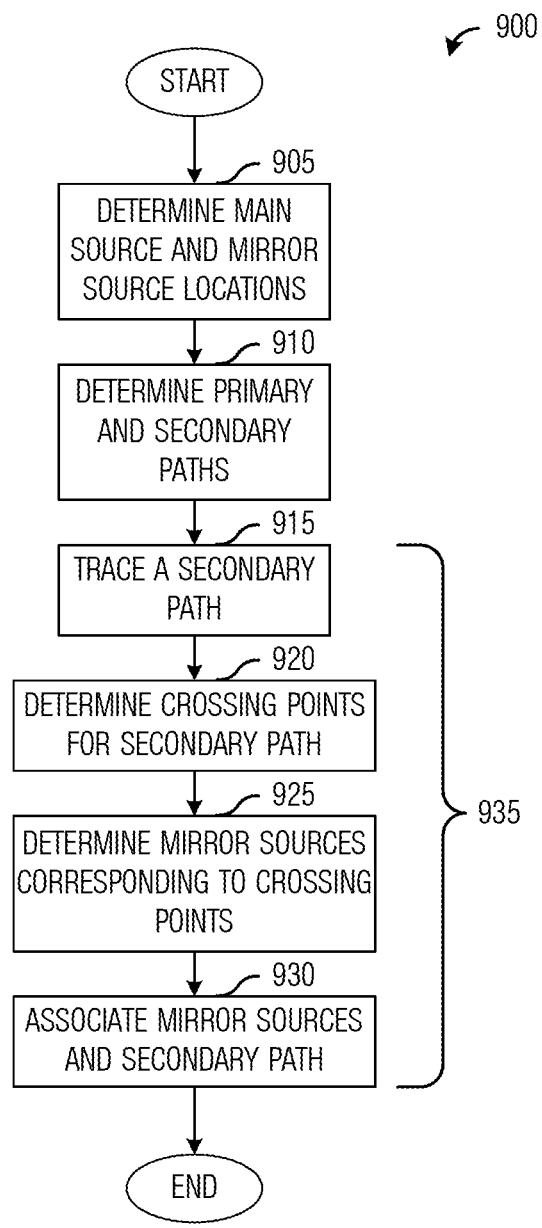
FIG. 9 illustrates a flow diagram of example high level operations occurring in a device determining associations between sources (main and mirror) and paths according to example embodiments described herein.

FIG. 9 illustrates a flow diagram of example high level operations 900 occurring in a device determining associations between sources (main and mirror) and paths. Operations 900 may be indicative of operations occurring in a device, such as a reception point or a standalone device, determines associations between sources (main and mirror) and paths.

Operations 900 begin with the device determining locations of the main source and the mirror sources (block 905). The locations of the main source and the mirror sources may be determined by scanning for the locations or using analytical methods to find the locations. Scanning involves the device using its antennas to determine the locations of the main source and the mirror sources. FIG. 8B illustrates an example of a rectangular room with its main source and some mirror sources. As an illustrative example, the device uses a fast acquisition system and method as presented in co-assigned U.S. Patent Application entitled "System and Method for Large Scale Multiple Input Multiple Output Communications", application Ser. No. 14/867,931, filed Sep. 28, 2015, which is hereby incorporated herein by reference, to scan for the locations of the main source and the mirror sources.

As an alternative illustrative example, the device uses an analytical system and method to find the locations of the main source and the mirror sources. For discussion purposes, consider a scenario where the location of the main source is (x1, y1, z1) with a reflective surface located at (z=A·x+B·y+C), where A, B, and C are constants. It is possible to find the location of a mirror source that is symmetric to the main source relative to the reflective surface. First, the coordinates of a projection of the main source onto the reflective surface is found. The coordinates of projection (x0, y0, z0) satisfying the condition $$z0 = A \cdot x0 + B \cdot y0 + C,$$

which is obtained by minimizing the following expression with respect to (x0, y0, z0)

$$D^2 = (x1-x0)^2 + (y1-y0)^2 + (z1 - A \cdot x0 + B \cdot y0 + C)^2.$$

Therefore, $$\begin{cases} \frac{\partial D^2}{\partial x0} = -2 \cdot (x1 - x0) - 2 \cdot (z1 - A \cdot x0 - B \cdot y0 - C) \cdot A = 0 \\ \frac{\partial D^2}{\partial y0} = -2 \cdot (y1 - y0) - 2 \cdot (z1 - A \cdot x0 - B \cdot y0 - C) \cdot B = 0 \end{cases} \text{or}$$

$$\begin{cases} x1 - x0 = (A \cdot x0 + B \cdot y0 + C - z1) \cdot A \\ y1 - y0 = (A \cdot x0 + B \cdot y0 + C - z1) \cdot B \end{cases} \text{or}$$

$$\begin{cases} x1 - x0 = A \cdot A \cdot x0 + A \cdot B \cdot y0 + A \cdot C - A \cdot z1 \\ y1 - y0 = B \cdot A \cdot x0 + B \cdot B \cdot y0 + B \cdot C - B \cdot z1 \end{cases} \text{or}$$

$$\begin{cases} x1 = (A^2 + 1) \cdot x0 + A \cdot B \cdot y0 + A \cdot C - A \cdot z1 \\ y1 = (B^2 + 1) \cdot y0 + A \cdot B \cdot x0 + B \cdot C - B \cdot z1 \end{cases} \text{or}$$

$$\begin{cases} x1 = (A^2 + 1) \cdot x0 + A \cdot B \cdot y0 + A \cdot C - A \cdot z1 \\ y0 = \frac{y1 - A \cdot B \cdot x0 - B \cdot C + B \cdot z1}{(B^2 + 1)} \end{cases} \text{or}$$

$$x1 = (A^2 + 1) \cdot x0 + A \cdot B \cdot \left( \frac{y1 - A \cdot B \cdot x0 - B \cdot C + B \cdot z1}{(B^2 + 1)} \right) + A \cdot C - A \cdot z1 \text{ or}$$

$$x1 = \left( (A^2 + 1) - \left( \frac{A^2 + B^2}{(B^2 + 1)} \right) \right) \cdot x0 + A \cdot B \cdot \left( \frac{y1 - B \cdot C + B \cdot z1}{(B^2 + 1)} \right) + A \cdot C - A \cdot z1.$$

The coordinates of the projection of the main source onto the reflective surface is expressible as $$x0 = \frac{x1 - A \cdot B \cdot \left(\frac{y1 - B \cdot C + B \cdot z1}{(B^2 + 1)}\right) - A \cdot C + A \cdot z1}{\left((A^2 + 1) - \left(\frac{A^2 \cdot B^2}{(B^2 + 1)}\right)\right)}$$

$$y0 = \frac{y1 - A \cdot B \cdot x0 - B \cdot C + B \cdot z1}{(B^2 + 1)}$$

$$z0 = A \cdot x0 + B \cdot y0 + C$$

The coordinates of the mirror source (x2, y2, z2) may be derived from the coordinates of the projection of the main source onto the reflective surface and the coordinates of the main source:

$(x2,y2,z2) = (x0,y0,z0) + ((x0,y0,z0) - (x1,y1,z1)) = 2 \cdot (x0, y0, z0) - (x1, y1, z1),$ hence, $x2 = 2 \cdot x0 - x1$ $y2 = 2 \cdot y0 - y1.$ $z2 = 2 \cdot z0 - z1$ The device determines primary paths and secondary paths (block 910). As discussed previously, primary paths are direct paths from main sources to reception points, while secondary paths are paths that include one or more reflections from main sources to reception points. The secondary paths may be modeled as paths without reflections (similar to primary paths but not originating from a main source) from mirror sources to reception points.

The device traces a secondary path (block 915). The device may trace a secondary path from a plurality of secondary paths found in block 910. The device traces the secondary path starting from the main source to the reception point. The device determines if the secondary path crosses any surfaces (reflective or otherwise) (block 920). Where the secondary path crosses a surface is referred to as a crossing point. The determination if the secondary path crosses any surfaces may be in accordance with physical environmental deployment (PED) information regarding the physical layout of the environment in which the communications device and the main sources are deployed. The PED information may include information about number and type (such as reflective or absorptive properties, penetration properties, and so on) of surfaces that reflect or absorb electromagnetic beams (such as walls, doors, ceilings, floors, and so forth), significant objects that reflect or absorb electromagnetic beams (such as large furniture pieces, large appliances, large mirrors, filing cabinets, computer servers, large televisions, and so on), less significant objects that reflect or absorb electromagnetic beams (such as small furniture pieces, art pieces, small appliances, small computers, displays, small televisions, printers, scanners, copiers, and the like), and the like. The PED information may also include information related to an extent of signal coverage since the extent of signal coverage has a role in determining which reception point sees which mirror source.

The device determines mirror sources that correspond with crossing points (block 925). A mirror source corresponds with a crossing point if it is aligned with the crossing point and a destination of the secondary path, which may be a reception point or a subsequent crossing point. The device associates each mirror source that corresponds with a crossing point with its respective crossing point (block 930). Blocks 915, 920, 925, and 930 may be referred to collectively as determining associations between sources and paths (blocks 935).

The device may be a standalone device responsible for determining paths (primary and secondary), locations of sources (main and mirror), and so on. In such a situation, the device may provide information about the paths and sources to a database. The device may communicate information about the paths and sources to a neighboring device having similar information obtained by the aforementioned example embodiments from its own vintage point, therefore allowing a network of devices to form a collective picture about all the main sources and mirror sources pertaining to the entire network. Alternatively, the device may be a standalone device responsible for performing channel estimation. In such a situation, the device may use information about the paths and sources to estimate channels. The device may provide information about the channel estimates to transmission points and reception points, or the device may provide the information about the channel estimates to a database. Alternatively, the device may be a communications device, such as a reception point or a transmission point. In such a situation, the device use information about the paths and sources to estimate channels for its own use. The device may also provide the information about the channel estimates to a database.

Figure 10:
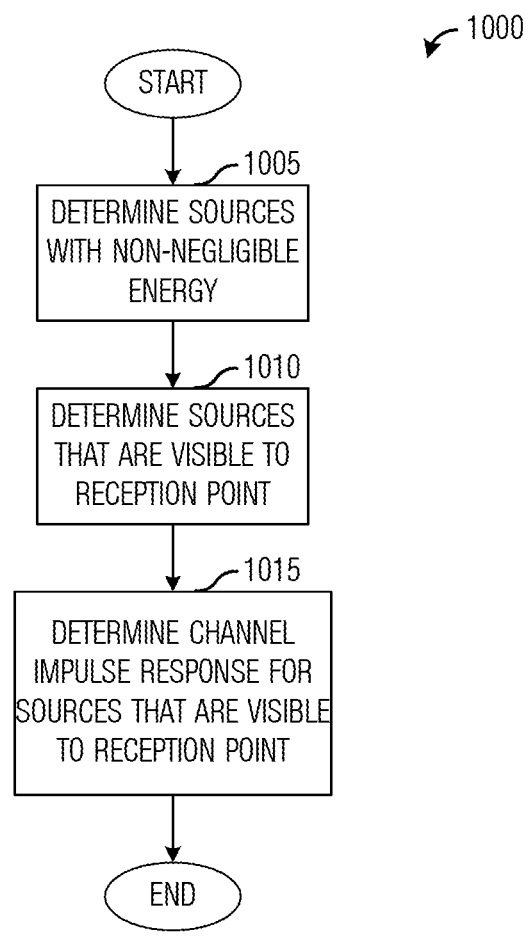
FIG. 10 illustrates a flow diagram of operations occurring in a device performing channel estimation from information about sources and paths according to example embodiments described herein.

FIG. 10 illustrates a flow diagram of operations 1000 occurring in a device performing channel estimation from information about sources and paths. Operations 1000 may be indicative of operations occurring in a device, such as a reception point or a standalone device, performs channel estimation from information about sources and paths.

Operations 1000 begin with the device determining sources that have non-negligible energy (block 1005). As discussed previously, when an electromagnetic beam reflects off a reflective surface, a portion of the energy present in the electromagnetic beam is absorbed by the reflective surface. Furthermore, there is also propagation loss. Therefore, the energy of the mirror sources decrease as the number of reflections increase. Eventually, the energy of mirror sources for paths that have many reflections (these mirror sources are referred to as higher order mirror sources) approaches zero. Hence, the number of significant mirror sources is finite. The device may simply specify a threshold energy level relative to the energy level of the main source and the mirror sources with energy levels exceeding the threshold energy level are non-negligible while those that do not exceed the threshold energy level are negligible. The device determines which of the mirror sources with non-negligible energy are visible to the reception point (block 1010). Those that are not visible to the reception point may be removed from consideration. The device determines a channel impulse response $H(\omega)$ as a sum of sources that are visible to the reception point (block 1015). As an illustrative example, the channel impulse response may be expressed as $$H(\omega) = \sum_{n=0}^{N-1} \sqrt{G_n} \cdot \left(\frac{2 \cdot D_n \cdot \omega}{c}\right)^2 \cdot \exp\left(j \cdot \frac{D_n \cdot \omega}{c}\right)$$

where n is a source index (n=0, 1, 2, ..., N−1) and n=0 is the main source, $D_n$ is a distance between the reception point and source n, $G_n$ is an energy of source n.

Figure 11:
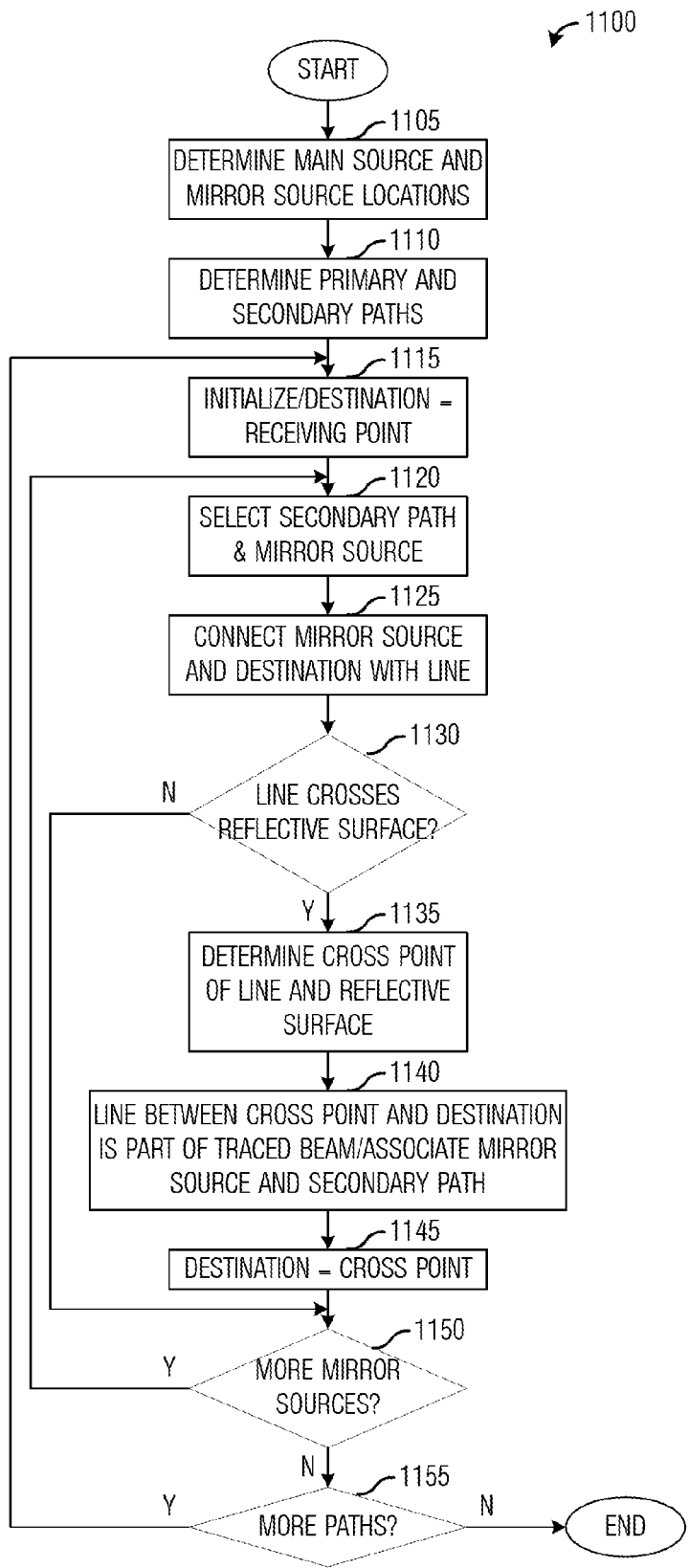
FIG. 11 illustrates a flow diagram of detailed operations occurring in a device determining associations between sources (main and mirror) and paths according to example embodiments described herein.

FIG. 11 illustrates a flow diagram of detailed operations 1100 occurring in a device determining associations between sources (main and mirror) and paths. Operations 1100 may be indicative of operations occurring in a device, such as a reception point or a standalone device, determines associations between sources (main and mirror) and paths. Operations 1100 may be a detailed view of an example implementation of operations 900 for higher order mirror sources (e.g., second, third, fourth, and so on, order mirror sources).

Operations 1100 begin with the device determining locations of main sources and mirror sources (block 1105). Determining the locations of main sources and mirror sources may be performed by scanning and/or analytical techniques. The device determines primary paths and secondary paths (block 1110).

The device initializes variables (block 1115). The variables initialized include a destination being set to the reception point. The device selects a secondary path and a mirror source (block 1120). The device connects the mirror source to the destination with a line (block 1125). The device performs a check to determine if the line crosses a surface, e.g., a reflective or absorptive surface (block 1130). If the line crosses a surface the device determines a point wherein the line crosses the surface, which is referred to as a cross point (block 1135). The device determines that a line between the cross point and the destination is part of a traced beam, thereby associating the mirror source with the secondary path (block 1140) and sets the destination to be the cross point (block 1145).

The device performs a check to determine if there are more mirror sources not checked with respect to the selected secondary path (block 1150). If there are more mirror sources not checked with respect to the selected secondary path, the device returns to block 1120 to select a mirror source to check with respect to the selected secondary path. If there are no more mirror sources in the selected secondary path, the device performs a check to determine if there are more secondary paths (block 1155). If there are more secondary paths, the device returns to block 1115 to reinitialize the variables and repeat the beam tracing with another secondary path. If there are no more secondary paths, operations 1100 terminates.

Figure 12A:
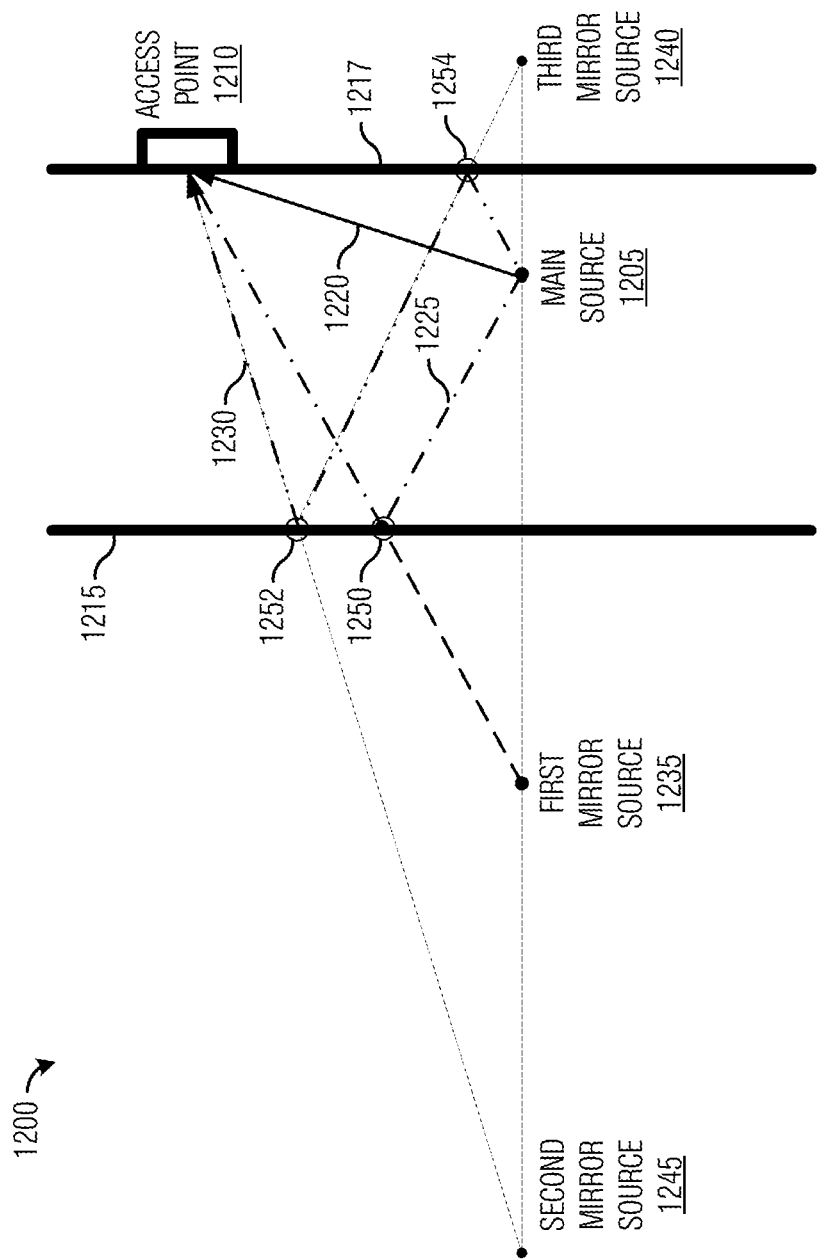
FIG. 12A illustrates an example communications system, highlighting primary and secondary paths and associated mirror sources according to example embodiments described herein.

FIG. 12A illustrates an example communications system 1200, highlighting primary and secondary paths and associated mirror sources. Communications system 1200 includes communicating devices, main source 1205 and an AP 1210. As shown in FIG. 12A, main source 1205 is making an uplink transmission to AP 1210. In other words, main source 1205 is the transmission point and AP 1210 is the reception point. Communications system 1200 is deployed in between a first wall 1215 and a second wall 1217. As an example, communications system 1200 is deployed indoors.

When main source 1205 sends a transmission to AP 1210, the transmission may follow a primary path 1220. The transmission may also follow several secondary paths, such as first secondary path 1225 where the transmission reflects off first wall 1215 before arriving at AP 1210, or a second secondary path 1230 where the transmission reflects off second wall 1217 and first wall 1215 before arriving at AP 1210. First secondary path 1225 reflects off a single wall, so there is a single mirror source associated with first secondary path 1225, which is shown in FIG. 12A as first reflected source 1235. Second secondary path 1230 reflects off two walls, so there are two mirror sources associated with second secondary path 1230, which are shown in FIG. 12A as second mirror source 1240 and third mirror source 1245.

Communications system 1200 of FIG. 12A is used to discuss operations 1100. A first example iteration through operations 1100 may involve first secondary path 1225 and first mirror source 1235. A line drawn from first mirror source 1235 to a destination (access point 1210) results in cross point 1250 and a line segment between cross point 1250 and the destination (access point 1210) being set as part of a first traced beam. With the destination being updated to be equal to cross point 1250, a line is drawn from main source 1205 to the destination. There are no new cross points and a line segment from main source 1205 and the destination is being set as part of the first traced beam. A second example iteration through operations 1100 may involve second secondary path 1230 and second mirror source 1245. A line drawn from second mirror source 1245 to a destination (reset back to access point 1210) results in cross point 1252 and a line segment between cross point 1252 and the destination (access point 1210) being set as part of a second traced beam. With the destination being updated to be equal to cross point 1252, a line is drawn from third mirror source 1240 to the destination results in cross point 1254 and a line segment from cross point 1254 and the destination (cross point 1252) being set as part of the second traced beam. With the destination being updated to be equal to cross point 1254, a line is drawn from main source 1205 to the destination. There are no new cross points and a line segment from main source 1205 and the destination is being set as part of the second traced beam.

Figure 12B:
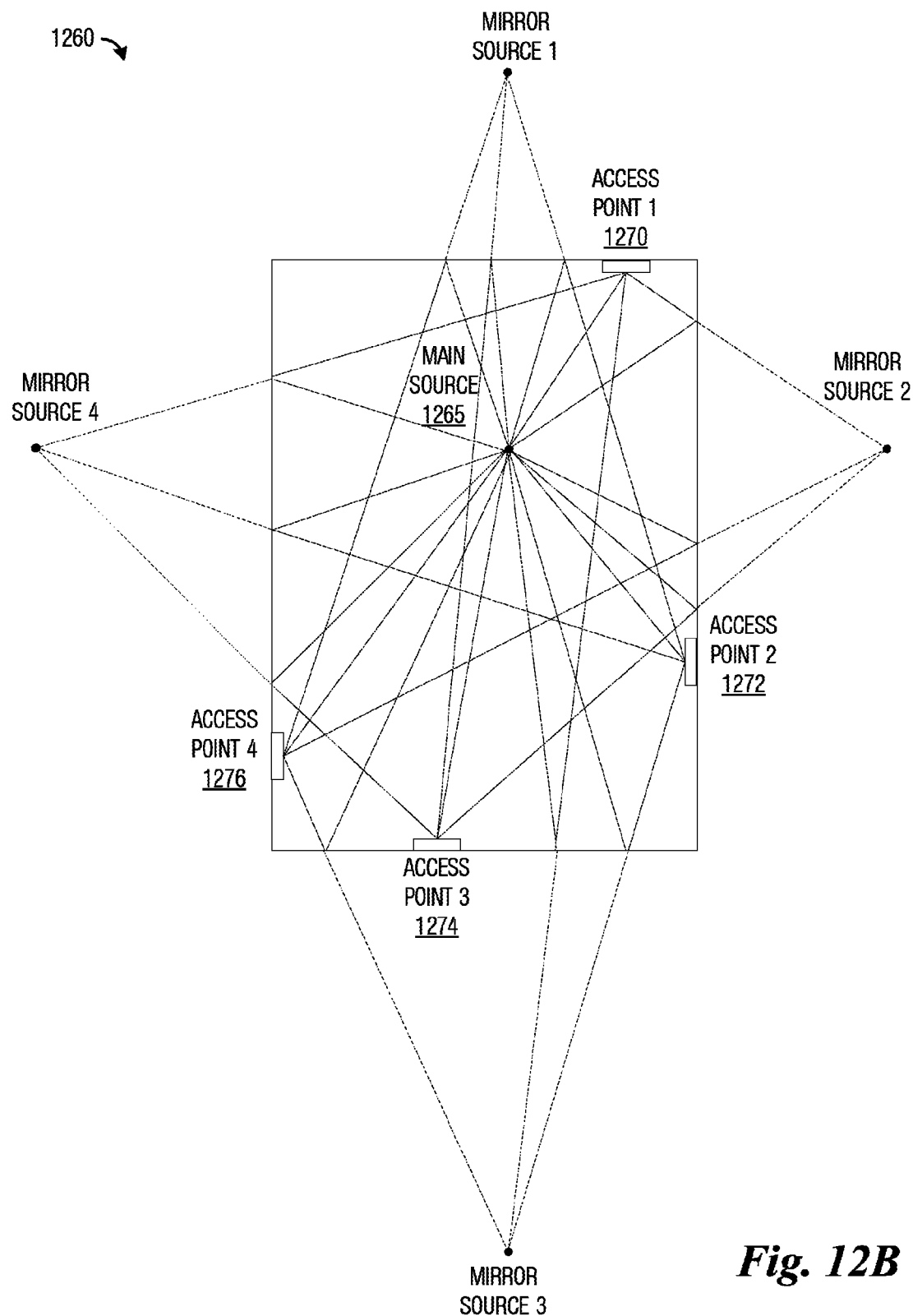
FIG. 12B illustrates a first example deployment of communications system according to example embodiments described herein.

FIG. 12B illustrates a first example deployment of communications system 1260. Communications system 1260 is deployed in an ideal rectangular shaped room with radiation absorbing materials in the ceiling and floor of the room. A main source 1265 is deployed in the room and four access points (access point 1 1270, access point 2 1272, access point 3 1274, and access point 4 1276) are positioned along the walls of the room. Table 1 provides information relating communications devices (APs) to main sources and/or mirror sources in a deployment as shown in FIG. 12B, where a "+" indicates that an AP is able to receive a signal from main source 1265 or a mirror source and a "−" indicates that an AP is unable to receive a signal from main source 1265 or a mirror source. Additionally, only first reflection mirror sources are considered. Table 1 provides an illustrative example of the information about the paths and the sources, as stored in a database.

TABLE 1

APs and sources in ideal rectangular room.

|  | AP 1 | AP 2 | AP 3 | AP 4 |
| --- | --- | --- | --- | --- |
| Main source | + | + | + | + |
| Minor Source # 1 | − | + | + | + |
| Minor Source # 2 | + | − | + | + |
| Minor Source # 3 | + | + | − | + |
| Minor Source # 4 | + | + | + | − |

As discussed previously, the information about the paths and the sources, as well as the PED information, may be provided to and stored in a database. The database may be accessible by transmission points and/or reception points that are operating in (or entering or exiting) an area corresponding to a span of the information (i.e., the information about the paths and sources, as well as the PED information) stored in the database.

Figure 13:
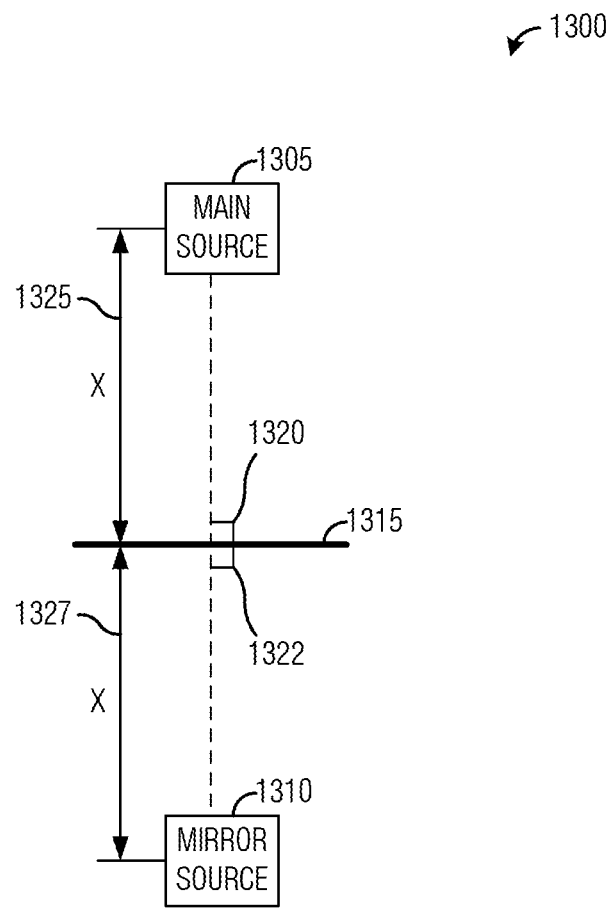
FIG. 13 illustrates a diagram of a relationship between a main source, a mirror source, and a reflective surface according to example embodiments described herein.

FIG. 13 illustrates a diagram 1300 of a relationship between a main source 1305, a mirror source 1310, and a reflective surface 1315. As shown in FIG. 13, there is a relationship between main source 1305, mirror source 1310, and reflective surface 1315 that may be described geometrically. As an illustrative example, given a first angle 1320 between main source 1305 and reflective surface 1315, a complementary second angle 1322 exists between mirror source 1310 and reflective surface 1315. Similarly, there is a relationship between a first distance 1325 between main source 1305 and reflective surface 1315 and a second distance 1327 between mirror source 1310 and reflective surface 1315. As an example, when first angle 1320 is 90 degrees, second angle 1322 is also 90 degrees and first distance 1325 is also equal to second distance 1327.

If some of the information about the paths or the sources is missing, it is possible to determine the missing information from the information that is known. As an illustrative example, it is possible to determine the location of reflective surface 1315 from the location of main source 1305 and mirror source 1310. As another illustrative example, it is possible to determine the location of main source 1305 from the location of mirror source 1310 and reflective surface 1315.

According to an example embodiment, the missing information is determined by a device in accordance with information about the paths and the sources, as well as the PED information retrieved from a database. The information about the paths and the sources, along with the PED information retrieved from the database may be incomplete; therefore, the device has to determine the missing information from the information available from the database. Although the device has to determine the missing information, it may be computationally advantageous compared to the device having to fully derive all of the information using scanning, measuring, and computing techniques as described herein.

Figure 14:
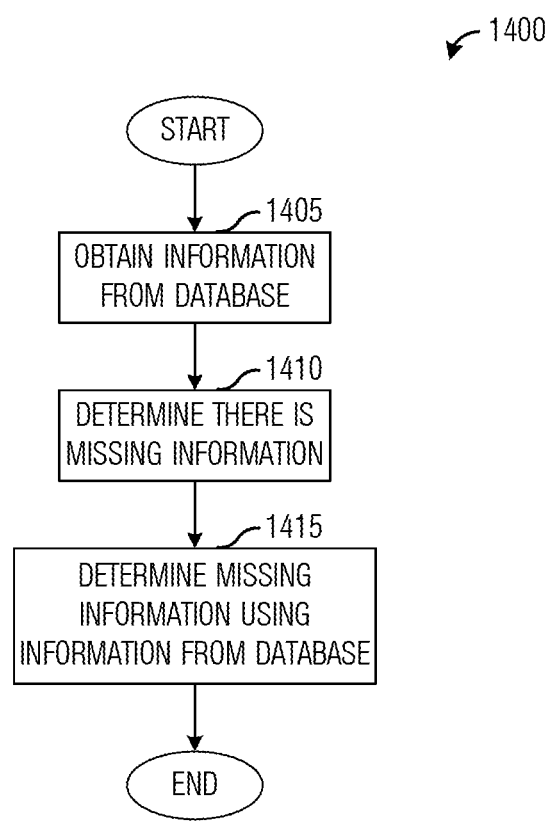
FIG. 14 illustrates a flow diagram of example operations occurring in a device determining missing information from information retrieved from a database according to example embodiments described herein.

FIG. 14 illustrates a flow diagram of example operations 1400 occurring in a device determining missing information from information retrieved from a database. Operations 1400 may be indicative of operations occurring in a device, such as a reception point or a standalone device, determining missing information from information retrieved from a database.

Operations 1400 begin with the device obtaining information from a database (block 1405). The device may send a request or query to the database and receive a message including the information from the database. Alternatively, the device may automatically receive a message including the information from the database as part of mobility operation, such as an attachment procedure, a handover, and so on. The device determines that there is missing information (block 1410) and determines the missing information from the information stored in the database (block 1415).

Figure 15:
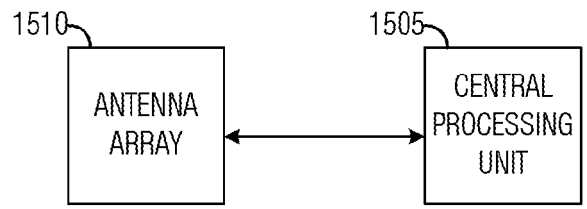
FIG. 15 illustrates an example MIMO communications device, highlighting the architecture of MIMO communications device according to example embodiments described herein.

FIG. 15 illustrates an example MIMO communications device 1500, highlighting the architecture of MIMO communications device 1500. MIMO communications device 1500 includes a central processing unit 1505 and an array of antennas 1510 coupled to central processing unit 1505. Array of antennas 1510 may include any number of antennas, but for large scale MIMO implementations, it is expected that array of antennas 1510 includes on the order of hundreds, thousands, tens of thousands, or more antennas. Central processing unit 1505 may be a single processor or a multi-processor system. Not shown in FIG. 15 are ancillary circuitry such as memories, network interfaces, user interfaces, power supplies, and so forth.

Figure 16:
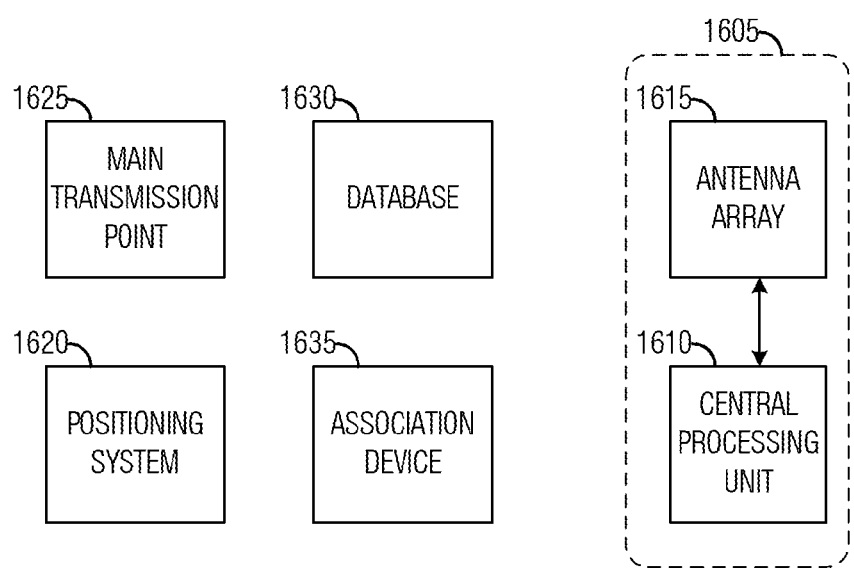
FIG. 16 illustrates an example MIMO communications system according to example embodiments described herein.

FIG. 16 illustrates an example MIMO communications system 1600. Communications system 1600 includes a MIMO communications device 1605 with a central processing unit 1610 and an antenna array 1615. Antennas of antenna array 1615 may be arranged in a one-, two-, or three-dimensional array with regular or irregular spacing between antennas. Communications system 1600 also includes a positioning system 1620 that is configured to transmit orthogonal reference signals to assist in determining position information of antennas of antenna array 1615. Communications system 1600 also includes a main transmission source 1625 communicating with MIMO communications device 1605.

Communications system 1600 also includes a database 1630 configured to store information paths and sources, as well as PED information. Database 1630 may be accessible by MIMO communications device 1605. Communications system 1600 also includes an association device 1635 configured to determine associations between sources and paths. Association device 1635 may implement techniques such as those described herein to associate sources and paths. Although shown in FIG. 16 as a standalone device, association device 1635 may be co-located with another entity in communications system 1600. As an illustrative example, association device 1635 may be co-located with database 1630, positioning system 1620, a transmission point, a MIMO communications device, and so on.

Figure 17:
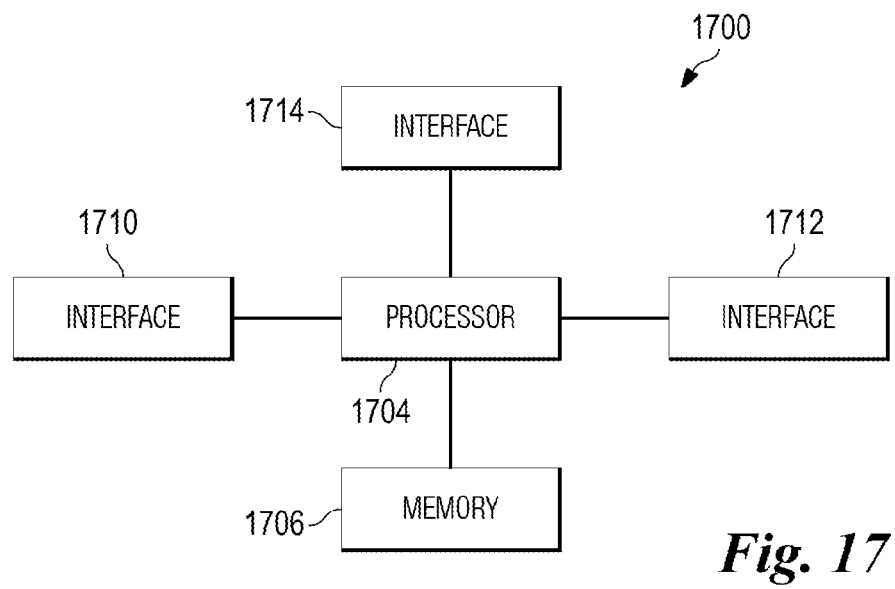
FIG. 17 illustrates a block diagram of an embodiment processing system for performing methods described herein.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1904. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
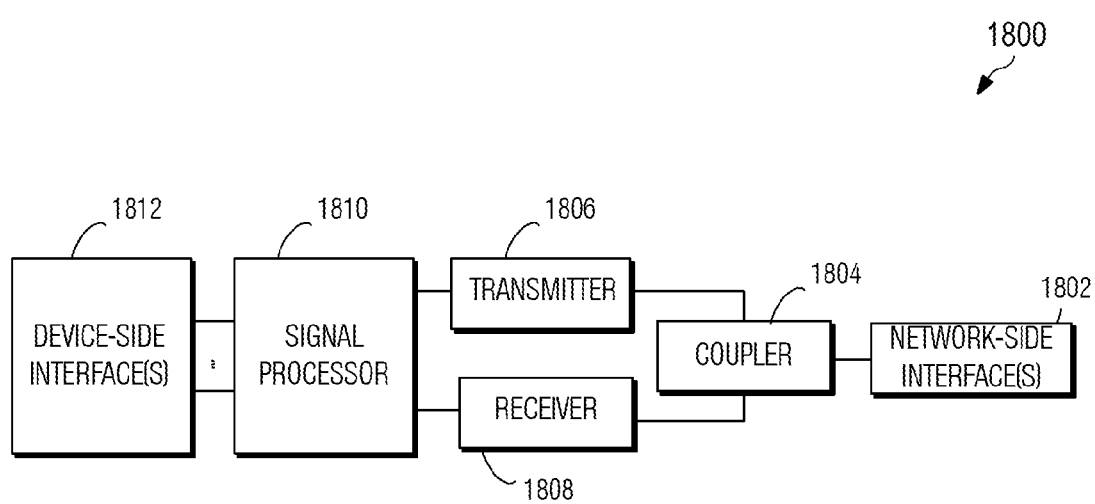
FIG. 18 illustrates a block diagram of a transceiver adapted to transmit and receive signaling over a telecommunications network according to example embodiments described herein.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for associating signal sources and paths, the method comprising:
 receiving radio frequency (RF) beams transmitted over secondary paths by an antenna of a reception point, wherein the RF beams reflect off one or more reflective surfaces before being received at the reception point;
 determining locations of mirror sources of the secondary paths in accordance with locations of the one or more reflective surfaces and a main source of the RF beams;
 determining associations between the secondary paths and the mirror sources based on cross points at which the RF beams reflected off the one or more reflective surfaces, thereby obtaining path-source associations; and
 instructing use of the path-source associations for multi-source channel estimation.

2. The method of claim 1, wherein determining the associations between the secondary paths and the mirror sources based on the cross points at which the beams reflected off the one or more reflective surfaces comprises:
 tracing a first one of the secondary paths from the main source to the reception point in accordance with locations of the main source and the mirror sources;
 determining that a first secondary path intersects at a first cross point on the one or more reflective surfaces;
 determining that a first mirror source aligns with the first cross point; and
 associating the first mirror source with the first secondary path.

3. The method of claim 1, wherein determining the associations between the secondary paths and the mirror sources based on the cross points at which the RF beams reflected off the one or more reflective surfaces comprises:
 tracing a first beam of the RF beams from the main source to the reception point in accordance with locations of the main source and the mirror sources;
 determining that the first beam intersects at a first cross point on the one or more reflective surfaces;
 determining that a first mirror source aligns with the first cross point; and
 associating the first mirror source with a secondary path corresponding to the first beam.

4. The method of claim 1, wherein instructing the use of the path-source associations comprises sending the path-source associations to the reception point, the path-source associations being used to perform the multi-source channel estimation at the reception point for transmissions from wireless devices at or near the main source.

5. The method of claim 1, wherein instructing the use of the path-source associations comprises performing the multi-source channel estimation on transmissions from wireless devices at or near the main source.

6. The method of claim 5, wherein performing the multi-source channel estimation comprises:
 determining a channel impulse response by summing contributions from non-negligible main and mirror sources visible to the reception point.

7. The method of claim 6, wherein the channel impulse response is expressible as $$H(\omega) = \sum_{n=0}^{N-1} \sqrt{G_n} \cdot \left(\frac{2 \cdot D_n \cdot \omega}{c}\right)^2 \cdot \exp\left(j \cdot \frac{D_n \cdot \omega}{c}\right)$$

where $H(\omega)$ is the channel impulse response, n is a source index (n=0, 1, 2, ..., N−1) of sources that are sources visible to the reception point, and n=0 is the main source, $D_n$ is a distance between the reception point and source n, $G_n$ is an energy of source n.

8. The method of claim 6, wherein performing the multi-source channel estimation further comprises:

selecting sources from a set comprising the main source and the mirror sources with energy levels exceeding a threshold energy level.

9. The method of claim 1, further comprising storing the path-source associations in a database.

10. The method of claim 1, further comprising:
retrieving location information about the main source and the mirror sources from a database; and
determining missing information regarding the main source and the mirror sources in accordance with the retrieved location information.

11. The method of claim 10, wherein the location information further comprises locations of the one or more reflective surfaces.

12. A device adapted to associate signal sources and paths, the device comprising:
a processor; and
a non-transitory computer readable storage medium storing programming for execution by the processor, the programming including instructions configuring the device to:
receive radio frequency (RF) beams transmitted over secondary paths by an antenna of a reception point, wherein the RF beams reflect off one or more reflective surfaces before being received at the reception point,
determine locations of mirror sources of the secondary paths in accordance with locations of the one or more reflective surfaces and a main source of the RF beams,
determine associations between the secondary paths and the mirror sources based on cross points at which the RF beams reflected off the one or more reflective surfaces, thereby obtaining path-source associations, and
instruct use of the path-source associations for multi-source channel estimation.

13. The device of claim 12, wherein the programming includes instructions to trace a first secondary path from the main source to the reception point in accordance with locations of the main source and the mirror sources, to determine that the first secondary path intersects at a first cross point on the one or more reflective surfaces, to determine that a first mirror source aligns with the first cross point, and to associate the first mirror source with the first secondary path.

14. The device of claim 12, wherein the programming includes instructions to trace a first beam of the RF beams from the main source to the reception point in accordance with locations of the main source and the mirror sources, to determine that the first beam intersects at a first cross point on the one or more reflective surfaces, to determine that a first mirror source aligns with the first cross point, and to associate the first mirror source with a secondary path corresponding to the first beam.

15. The device of claim 12, wherein the programming includes instructions to send the path-source associations to the reception point, the path-source associations being used to perform the multi-source channel estimation at the reception point for transmissions from wireless devices at or near the main source.

16. The device of claim 15, wherein the device is an associating device.

17. The device of claim 12, wherein the programming includes instructions to perform the multi-source channel estimation on transmissions from wireless devices at or near the main source.

18. The device of claim 17, wherein the device is the reception point.

19. The device of claim 12, wherein the programming includes instructions to retrieve location information about the main source and the mirror sources from a database, and to determine missing information regarding the main source and the mirror sources in accordance with the retrieved location information.

20. A multiple input multiple output (MIMO) communications system comprising:
a main transmission point;
a MIMO communications device including an antenna array comprising a plurality of antenna units, and a first processor; and
an associating device including
a second processor, and
a non-transitory computer readable storage medium storing programming for execution by the second processor, the programming including instructions configuring the associating device to
receive radio frequency (RF) beams transmitted over secondary paths by an antenna of a reception point, wherein the RF beams reflect off one or more reflective surfaces before being received at the reception point,
determine locations of mirror sources of the secondary paths in accordance with locations of the one or more reflective surfaces and a main source of the RF beams,
determine associations between the secondary paths and the mirror sources based on cross points at which the RF beams reflected off the one or more reflective surfaces, thereby obtaining path-source associations, and
instruct use of the path-source associations for multi-source channel estimation.

21. The MIMO communications system of claim 20, further comprising
a database configured to store the path-source associations.

22. The MIMO communications system of claim 21, wherein the database is configured to provide location information about the main source and the mirror sources.

* * * * *